(12) United States Patent
Sihare

(10) Patent No.: US 8,713,257 B2
(45) Date of Patent: Apr. 29, 2014

(54) METHOD AND SYSTEM FOR SHARED HIGH SPEED CACHE IN SAS SWITCHES

(75) Inventor: Ankit Sihare, Bangalore (IN)

(73) Assignee: LSI Corporation, San Jose, CA (US)

( * ) Notice: Subject to any disclaimer, the term of this patent is extended or adjusted under 35 U.S.C. 154(b) by 197 days.

(21) Appl. No.: 13/218,569

(22) Filed: Aug. 26, 2011

(65) Prior Publication Data

US 2013/0054883 A1  Feb. 28, 2013

(51) Int. Cl.
*G06F 12/00* (2006.01)
*G06F 13/00* (2006.01)
*G06F 13/28* (2006.01)
*G06F 12/08* (2006.01)

(52) U.S. Cl.
CPC .......... *G06F 12/084* (2013.01); *G06F 12/0866* (2013.01)
USPC ......................................................... 711/130

(58) Field of Classification Search
CPC ........................... G06F 12/0866; G06F 12/084
USPC ................................. 711/105, 130
See application file for complete search history.

(56) References Cited

U.S. PATENT DOCUMENTS

| 6,792,507 | B2 * | 9/2004 | Chiou et al. ................... 711/119 |
| 2005/0228924 | A1 | 10/2005 | Marushak et al. |
| 2006/0215682 | A1 | 9/2006 | Chikusa et al. |
| 2008/0235468 | A1 * | 9/2008 | Chen et al. ..................... 711/154 |
| 2010/0036948 | A1 * | 2/2010 | Cassiday et al. ............... 709/225 |
| 2010/0121940 | A1 * | 5/2010 | Reeser ........................... 709/219 |

* cited by examiner

*Primary Examiner* — Matthew Bradley
*Assistant Examiner* — Rocio Del Mar Perez-Velez
(74) *Attorney, Agent, or Firm* — Suiter Swantz pc llo

(57) ABSTRACT

A data storage system includes at least one host device configured to initiate a data request, at least one target device configured to store data, and a serial attached SCSI (SAS) switch coupled between the at least one host device and the at least one target device. The SAS switch includes a cache memory and includes control programming configured to determine whether data of the data request is stored in the cache is at least one of data stored in the cache memory of the SAS switch or data to be written in the cache memory of the SAS switch. The cache memory of the SAS switch is a shared cache that is shared across each of the at least one host device and the at least one target device.

20 Claims, 2 Drawing Sheets

METHOD AND SYSTEM FOR SHARED HIGH SPEED CACHE IN SAS SWITCHES

FIELD

The present disclosure generally relates to the field of data storage systems, and more particularly to a method and system for implementing shared high speed cache in SAS switches.

BACKGROUND

In the field of data storage systems, access speed of a storage system is often a limiting factor of overall storage performance. For instance, current serial attached small computer system interface (SCSI) (SAS) drives may sustain approximately 300 IOPS (input/output operations per second), whereas current SATA (serial AT attachment) drives may sustain approximately 100 IOPS. Such speed limitations of SAS/SATA devices may cause a data storage system to quickly reach a maximum performance threshold, particularly in a WEB server environment, where the same data is typically accessed multiple times. Current SAS and SATA storage devices may incorporate a cache, which is confined to the enclosure. Thus, if one enclosure has a cache implemented, other enclosures may not have direct access to the data stored within the cache, thereby limiting utility of the cache to the particular enclosure. It may not be cost effective to implement a cache within each enclosure of a storage system, nor would such an implementation be particularly scalable.

SUMMARY

In one implementation of the present disclosure, a data storage system includes at least one host device configured to initiate a data request, at least one target device configured to store data, and a serial attached SCSI (SAS) switch coupled between the at least one host device and the at least one target device. The SAS switch includes a cache memory and includes control programming configured to determine whether data of the data request is stored in the cache is at least one of data stored in the cache memory of the SAS switch or data to be written in the cache memory of the SAS switch. The cache memory of the SAS switch is a shared cache that is shared across each of the at least one host device and the at least one target device.

In another implementation of the present disclosure, a method of processing a data request includes receiving a data request and determining whether the data request is a read command or a write command. When the data request is a read command, the method includes determining whether data of the data request is stored in a cache integrated in an SAS switch. When the data is stored in the cache integrated in the SAS switch, the method includes serving the data request from the cache integrated in the SAS switch. When the data is not stored in the cache integrated in the SAS switch, the method includes forwarding the read command from the SAS switch to a target device. When the data request is a write command, the method includes determining whether data of the data request is at least one of a hotspot or data to be stored in the cache integrated in the SAS switch. When the data is at least one of a hotspot or data to be stored in the cache integrated in the SAS switch, the method includes writing the data to the cache integrated in the SAS switch. When the data is not at least one of a hotspot or data to be stored in the cache integrated in the SAS switch, the method includes accessing a target device to write the data.

In a further implementation of the present disclosure, a method of processing at least one of a read request or a write request from a host device includes receiving at least one of the read request or the write request from the host device. When a read request is received, the method includes determining whether data of the read request is stored in a cache integrated in an SAS switch. When the data is stored in the cache integrated in the SAS switch, the method includes serving the data request from the cache integrated in the SAS switch. When the data is not stored in the cache integrated in the SAS switch, the method includes forwarding the read request from the SAS switch to a target device. When a write request is received, the method includes determining whether data of the read request is data to be stored in the cache integrated in the SAS switch. When the data is data to be stored in the cache integrated in the SAS switch, the method includes writing the data to the cache integrated in the SAS switch. When the data is not data to be stored in the cache integrated in the SAS switch, the method includes accessing a target device to write the data.

It is to be understood that both the foregoing general description and the following detailed description are exemplary and explanatory only and are not necessarily restrictive of the disclosure as claimed. The accompanying drawings, which are incorporated in and constitute a part of the specification, illustrate an embodiment of the disclosure and together with the general description, serve to explain the principles of the disclosure.

BRIEF DESCRIPTION OF THE DRAWINGS

The numerous advantages of the present disclosure may be better understood by those skilled in the art by reference to the accompanying figures in which.

DETAILED DESCRIPTION

Reference will now be made in detail to the presently preferred embodiments of the present disclosure, examples of which are illustrated in the accompanying drawings.

Figure 1A:
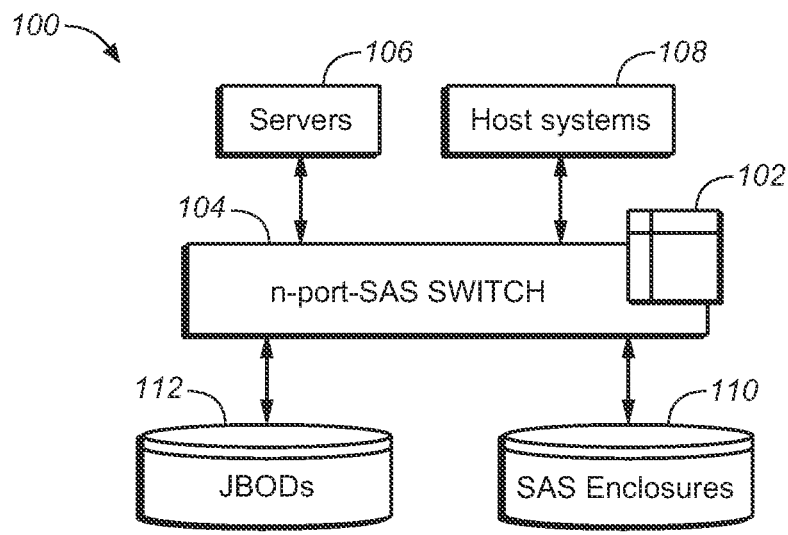
FIG. 1A is a schematic illustration of a system having an SAS switch with an integrated cache.
Figure 1B:
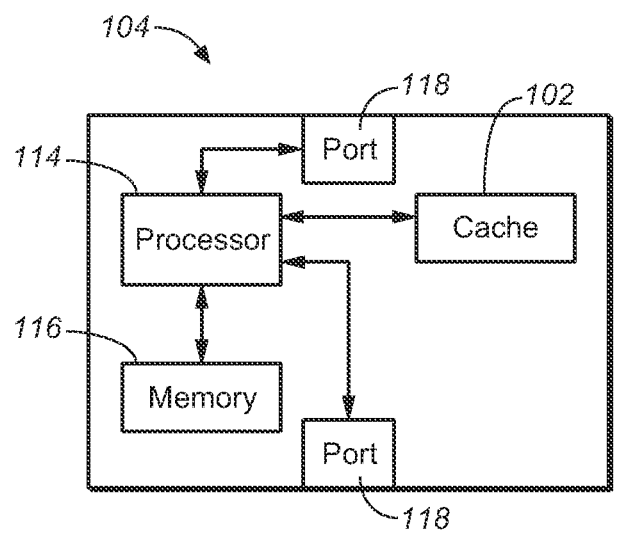
FIG. 1B is a schematic illustration of the SAS switch of FIG. 1A.

In a storage environment, a cache system may be used to improve the IOPS performance of a data storage system. Typically, caches are incorporated by relatively high-speed data storage devices, such as solid state drives (SSDs). Current SAS drives may sustain approximately 300 IOPS, current SATA drives may sustain approximately 100 IOPS, and SSDs are currently capable of performing between approximately 15,000 and 35,000 IOPS. Referring now to FIGS. 1A and 1B, a storage system 100 is displayed with a cache 102 (e.g., one or more high speed storage disks) integrated in an SAS switch 104. The storage system 100 may comprise direct attached storage (DAS) scalable infrastructure. In a particular implementation of the present disclosure, an SSD is implemented as the cache 102 integrated in the SAS switch 104. Utilizing the SSD as the cache 102 may allow a relatively large data set to be readily present in the data storage system 100. While an SSD device may be used in an SAS switch to implement a shared cache among the devices for which communication is facilitated by the switch, the present disclosure is not limited to SSD drives, and other storage devices may be utilized to implement the cache 102 in the SAS switch 104.

The SAS switch 104 may facilitate communication between initiators (e.g., via SAS host bus adapters (HBAs)), including servers 106 and host systems 108, and target storage devices, including SAS enclosures 110 and JBODs ("just a bunch of disks") 112. In particular, the cache 102 may ensure the cache requirements for each of the servers 106, host systems 108, SAS enclosures 110, and JBODs 112 that the cache 102 is connected to via the SAS switch 104. The cache 102 therefore functions as a shared cache for the storage system 100. This disclosure thus introduces a shared high capacity, high speed cache integrated in an SAS switch 104, which can be dynamically allocated to IO requests facilitated through the SAS switch 104.

The SAS switch 104 may include the cache 102, a processor 114, a memory 116, and a plurality of ports 118. In a particular implementation, the processor 114 is configured to process and/or implement control programming for the SAS switch 104. For instance, the control programming may be stored in one or more of software or firmware stored in the memory 116 for execution by the processor 114 to control operations of the SAS switch 104. Current SAS switch control programming (e.g., firmware) may require modification in order to process cache algorithms and switch operations. In a particular implementation, a modified SAS firmware algorithm is configured to determine whether data should be considered as cache data or not. Typically, data that is most frequently accessed will be designated as cache data, and the switch firmware is configured to designate that data as a hotspot. For instance, for a particular algorithm, a high number of reads for a particular LBA (logical block address) may indicate read cache data, whereas a high number of writing operations for a particular data to a number of LBA locations may indicate write cache data. By designating data as a hotspot, the data storage system may ensure faster access of frequently used data (for read and/or write operations), which in turn may improve system performance.

The cache 102 in the SAS switch 104 may be divided into a plurality of windows that are allocated to read/write cache data. Multi-window IOs may be supported, with the SAS switch 104 being configured to handle each window as a separate IO. Whenever a read or write request originates from an SAS controller, the cache 102 in the SAS switch 104 is referred. If data is found in the cache 102, the system 100 registers a cache HIT, whereas if the data is not found in the cache 102, the system registers a cache MISS. In general, the higher number of cache HITs, the higher the performance of the data storage system, as the data is more readily accessible via the cache 102.

The cache 102 in the SAS switch 104 may further be configured to store metadata information including target VD (virtual directory) ID, target LBA, target enclosure ID, and the like. This information may be included to provide any read or write operation which utilizes cache data to obtain necessary information of its destination in the data storage system.

Figure 2:
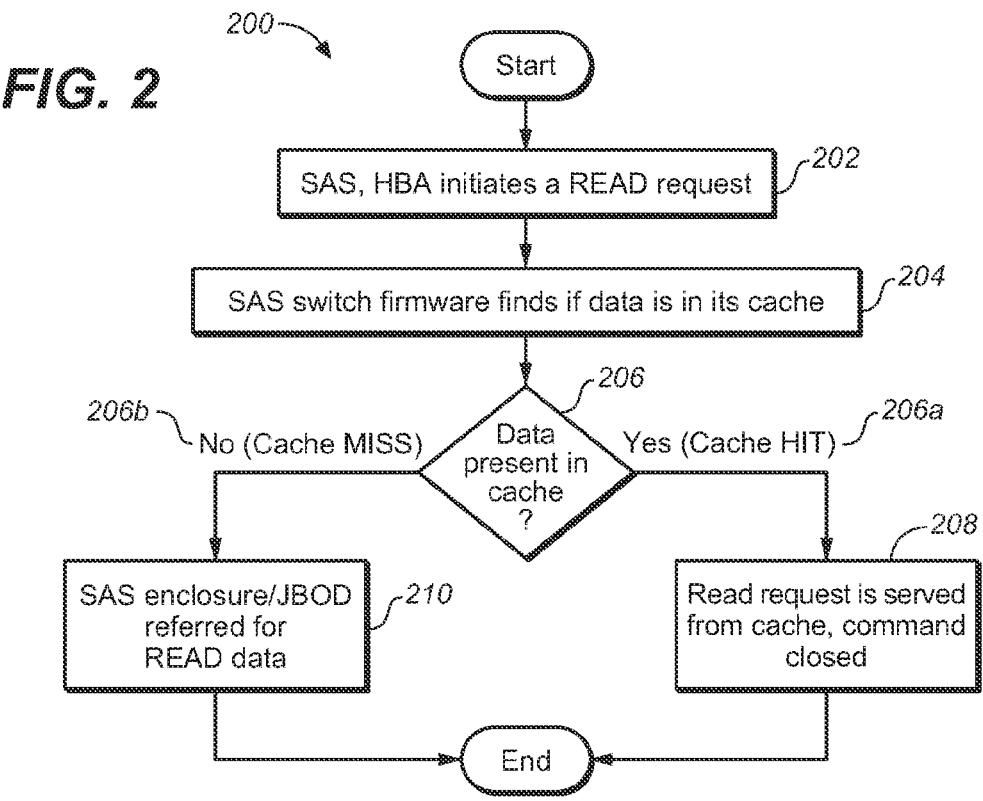
FIG. 2 is a flow chart of a process of handling a read request with an SAS switch having an integrated cache.

Referring now to FIG. 2, a flow diagram of a process 200 of handling a read request with an SAS switch having an integrated cache is shown. As shown, an SAS HBA may initiate a READ request, 202. When the READ command is configured to go through the SAS switch (e.g., switch 104 of FIG. 1), the SAS switch firmware will refer to the switch cache, 204, to determine whether the data requested is available in the switch cache, 206. If the cache switch determines that the requested data is available in the cache (cache HIT), 206a, the READ command will be served, 208, and the operation completes. If the cache switch determines that the requested data is not available in the cache (cache MISS), 206b, the READ request will be forwarded to the destination enclosure /VD/LBA, 210.

Figure 3:
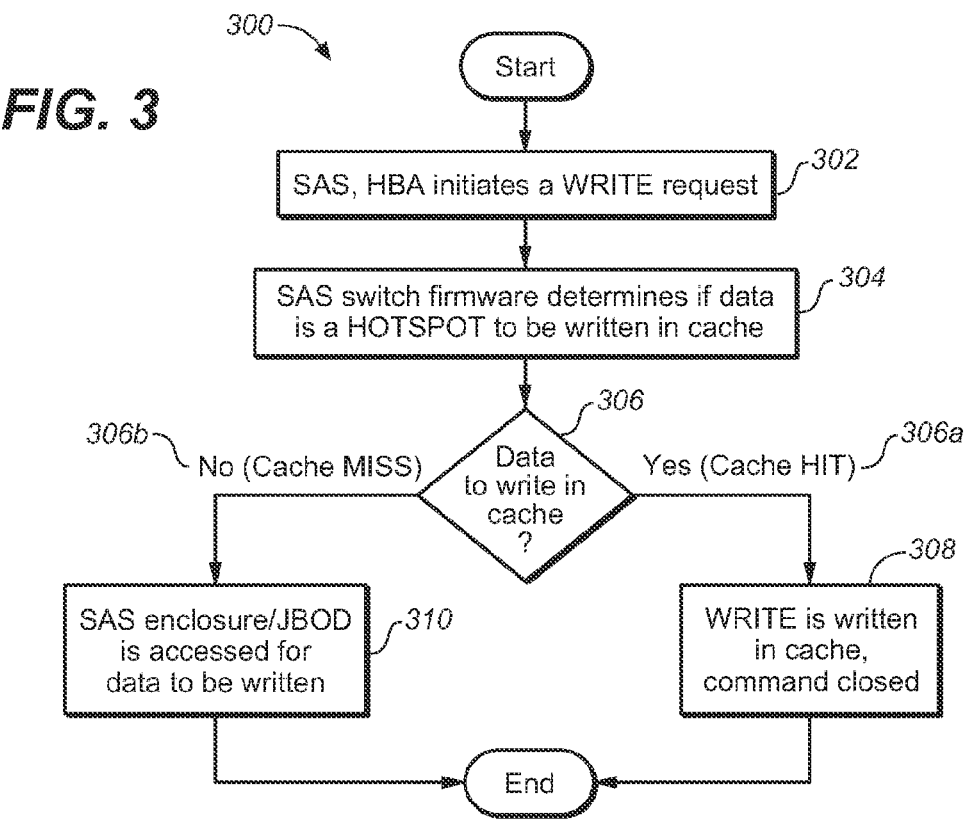
FIG. 3 is a flow chart of a process of handling a write request with an SAS switch having an integrated cache.

Referring now to FIG. 3, a flow diagram of a process 300 of handling a write request with an SAS switch having an integrated cache is shown. As shown, an SAS HBA may initiate a WRITE request, 302. The SAS switch firmware (e.g., firmware incorporated by SAS switch 104 of FIG. 1) will refer to the switch cache, 304, to determine whether the data to be written is a hotspot/cache data, 306. If the cache switch determines that the data to be written is cache data (cache HIT), 306a, a window in the switch cache is allocated for the data, and the data is written to the cache, 308, and the operation completes. Once the cache data is written, the switch cache may start flushing the data to the respective target locations in the enclosures connected to the switch. In operation, an IO flow preferably writes to DRAM cache first. Flushes from DRAM cache may be written to a Secondary Write Log Cache. DRAM cache flush may optimize one or more flushes to bypass Write Log on relatively large (e.g., strip worth) sequential write commands, which may directly pass to hard disk drives (HDDs).

If the cache switch determines that the requested data is not data to be written to the cache (cache MISS), 306b, a target device (e.g., destination enclosure/JBOD) is accessed for data to be written, 310.

It is believed that the present disclosure and many of its attendant advantages will be understood by the foregoing description, and it will be apparent that various changes may be made in the form, construction and arrangement of the components thereof without departing from the scope and spirit of the disclosure or without sacrificing all of its material advantages. The form herein before described being merely an explanatory embodiment thereof, it is the intention of the following claims to encompass and include such changes.

What is claimed is:

1. A data storage system, comprising:
   at least one host device configured to initiate a data request;
   a plurality of target devices configured to store data; and
   a serial attached SCSI (SAS) switch coupled between the at least one host device and the plurality of target devices, the SAS switch including an integrated cache memory, a processor, a plurality of ports, and control programming, wherein the control programming of the SAS switch is configured to:
      as the data request is passed through the SAS switch from the at least one host device to one or more of the plurality of target devices, determine whether to designate data of the data request as cache data;
      determine whether data of the data request is stored in the cache memory of the SAS switch;
      determine whether data of the data request is data to be written in the cache memory of the SAS switch;
      when the data request is a write request, upon a determination of a cache hit, write data in the cache and close the write request; and
      when the data request is a read request, upon a determination of a cache hit, serve data from cache and close the read request,
   wherein the cache memory of the SAS switch is a shared cache that is shared across each of the at least one host device and the plurality of target devices.

2. The system of claim 1, wherein SAS switch includes a solid state drive to provide the cache memory.

3. The system of claim 1, wherein the cache memory includes DRAM cache.

4. The system of claim 1, wherein the SAS switch is coupled to the at least one host device via a physical connector between the at least one host device and the SAS switch, wherein the SAS switch is coupled to the plurality of target devices via a physical connector between the plurality of target devices and the SAS switch, wherein a particular host device of the at least one host device includes a host bus adapter.

5. The system of claim 1, wherein the control programming is configured to determine whether the data request involves a write command.

6. The system of claim 5, wherein the control programming is configured to determine whether data of the data request is a hotspot to be written to the cache memory of the SAS switch.

7. The data storage system of claim 1, wherein the cache memory of the SAS switch is divided into a plurality of windows, each of the plurality of windows of the cache memory being allocated to at least one of read cache data and write cache data,
wherein the SAS switch is configured to support multi-window data requests, each window of a particular multi-window data request being handled as a separate data request.

8. The data storage system of claim 1, wherein the cache memory is configured to store metadata information, the metadata information including target virtual directory identification information, target logical block address information, and target enclosure identification information,
wherein the SAS switch is configured to determine and provide destination information associated with a particular data request based upon the metadata information stored in the cache memory of the SAS switch.

9. The data storage system of claim 1, wherein the plurality of target devices includes a plurality of SAS enclosures.

10. The data storage system of claim 1, wherein the at least one host device includes a plurality of host devices, and wherein the plurality of target devices includes a plurality of SAS enclosures and just a bunch of disks.

11. A method of processing a data request in a data storage system which includes at least one host device, a plurality of target devices, and a serial attached SCSI (SAS) switch, the SAS switch including a cache, a processor, a plurality of ports, and control programming, the method comprising:
receiving a data request from a host device of the at least one host device;
determining whether the data request is a read command or a write command;
when the data request is a read command, determining whether data of the data request is stored in the cache, the cache being integrated in the SAS switch;
when the data is stored in the cache integrated in the SAS switch, serving the data request from the cache integrated in the SAS switch;
closing the read command upon serving the data request from the cache integrated in the SAS switch;
when the data is not stored in the cache integrated in the SAS switch, forwarding the read command from the SAS switch to a target device of the plurality of target devices;
when the data request is a write command, determining whether data of the data request is at least one of a hotspot or data to be stored in the cache integrated in the SAS switch;
when the data is at least one of a hotspot or data to be stored in the cache integrated in the SAS switch, writing the data to the cache integrated in the SAS switch;
closing the write command upon writing the data to the cache integrated in the SAS switch; and
when the data is not at least one of a hotspot or data to be stored in the cache integrated in the SAS switch, accessing a target device of the plurality of target devices to write the data.

12. The method of claim 11, wherein the cache integrated in the SAS switch is divided into a plurality of windows, each of the plurality of windows of the cache being allocated to at least one of read cache data and write cache data, wherein the SAS switch is configured to support multi-window data requests, each window of a particular multi-window data request being handled as a separate data request, the method further including:
allocating a window of the plurality of windows in the cache integrated in the SAS switch when the data is at least one of a hotspot or data to be stored in the cache integrated in the SAS switch.

13. The method of claim 11, further including:
flushing, from the cache integrated in the SAS switch, the data to a target location in the target device of the plurality of target devices upon writing the data to the cache integrated in the SAS switch.

14. A method of processing a read request and a write request from a host device in a data storage system which includes at least one host device, a plurality of target devices, and a serial attached SCSI (SAS) switch, the SAS switch including a cache, a processor, and control programming, the method comprising:
receiving the read request and the write request from the host device;
when the read request is received, determining whether data of the read request is stored in the cache, the cache being integrated in the SAS switch;
when the data is stored in the cache integrated in the SAS switch, serving the data request from the cache integrated in the SAS switch;
closing the read request upon serving the data request from the cache integrated in the SAS switch;
when the data is not stored in the cache integrated in the SAS switch, forwarding the read request from the SAS switch to a target device of the plurality of target devices;
when the write request is received, determining whether data of the write request is data to be stored in the cache integrated in the SAS switch;
when the data is data to be stored in the cache integrated in the SAS switch, writing the data to the cache integrated in the SAS switch;
closing the write request upon writing the data to the cache integrated in the SAS switch; and
when the data is not data to be stored in the cache integrated in the SAS switch, accessing a target device of the plurality of target devices to write the data.

15. The method of claim 14, further including:
determining whether data of the read request is a hotspot.

16. The method of claim 15, further including:
when the data is a hot spot, writing the data to the cache integrated in the SAS switch.

17. The method of claim 14, wherein the cache integrated in the SAS switch is divided into a plurality of windows, each of the plurality of windows of the cache being allocated to at least one of read cache data and write cache data, wherein the SAS switch is configured to support multi-window data requests, each window of a particular multi-window data request being handled as a separate data request, the method further including:
- allocating a window in the cache integrated in the SAS switch when the data is data to be stored in the cache integrated in the SAS switch.

18. The method of claim 14, further including:
- flushing, from the cache integrated in the SAS switch, the data to a target location in the target device of the plurality of target devices.

19. The method of claim 14, wherein writing the data to the cache integrated in the SAS switch includes:
- writing the data to DRAM cache of the cache integrated in the SAS switch.

20. The method of claim 14, further including:
- providing the cache via a solid state drive integrated with the SAS switch.

\* \* \* \* \*